(12) United States Patent
Isaksson et al.

(10) Patent No.: US 9,807,018 B2
(45) Date of Patent: Oct. 31, 2017

(54) TRANSMITTING DATA PACKETS IN AN INDUSTRIAL WIRELESS NETWORK

(71) Applicant: ABB RESEARCH LTD, Zürich (CH)

(72) Inventors: Alf Isaksson, Västerås (SE); Johan Åkerberg, Västerås (SE); Krister Landernäs, Hallstahammar (SE)

(73) Assignee: ABB Research Ltd., Zurich (CH)

( * ) Notice: Subject to any disclaimer, the term of this patent is extended or adjusted under 35 U.S.C. 154(b) by 90 days.

(21) Appl. No.: 14/908,939

(22) PCT Filed: Sep. 9, 2014

(86) PCT No.: PCT/EP2014/069119
§ 371 (c)(1),
(2) Date: Jan. 29, 2016

(87) PCT Pub. No.: WO2015/043940
PCT Pub. Date: Apr. 2, 2015

(65) Prior Publication Data
US 2016/0173385 A1 Jun. 16, 2016

(30) Foreign Application Priority Data
Sep. 25, 2013 (EP) .................................... 13185907

(51) Int. Cl.
*H04L 12/801* (2013.01)
*H04L 12/851* (2013.01)
(Continued)

(52) U.S. Cl.
CPC .............. *H04L 47/14* (2013.01); *H04L 47/24* (2013.01); *H04L 47/283* (2013.01); *H04L 47/32* (2013.01); *H04W 28/0268* (2013.01)

(58) Field of Classification Search
CPC ....... H04L 47/14; H04L 47/24; H04L 47/283; H04L 47/32; H04W 28/0268
See application file for complete search history.

(56) References Cited

U.S. PATENT DOCUMENTS

| 7,649,912 B2 * | 1/2010 | Balasubramanian . H04J 3/0673 370/503 |
| 2005/0198034 A1 * | 9/2005 | Boyer ................ G05B 19/4183 |

(Continued)

FOREIGN PATENT DOCUMENTS

CN 102882642 A 1/2013

OTHER PUBLICATIONS

Weaver et al., "Computer Communications for Factory Automation", IEEE, 1993, pp. 413-418, see pp. 415-417, marked text.

*Primary Examiner* — Duc C Ho
(74) *Attorney, Agent, or Firm* — Birch, Stewart, Kolasch & Birch, LLP

(57) ABSTRACT

A wireless communication device providing a node in an industrial wireless network investigates if there is more than one data packet with process control data from the same data originating device destined for a process control device in a transmission queue, where the data originating device is an interface to the process being controlled and transmits data packets in the transmission queue. If there is more than one such data packet, the wireless communication device further compares time stamps of the data packets, where a time stamp reflects the time of generation of a corresponding data packet, keeps the newest data packet and discards older data packets, so that only the most recent data packets from a data originating device are sent to the process control device from the node.

20 Claims, 4 Drawing Sheets

(51) Int. Cl.
    *H04L 12/841*    (2013.01)
    *H04L 12/823*    (2013.01)
    *H04W 28/02*    (2009.01)

(56) References Cited

U.S. PATENT DOCUMENTS

| | | |
|---|---|---|
| 2007/0294393 A1 | 12/2007 | Smith et al. |
| 2011/0026500 A1 | 2/2011 | Shaffer et al. |
| 2011/0044276 A1 | 2/2011 | Albert et al. |
| 2011/0058554 A1 | 3/2011 | Jain et al. |
| 2011/0286386 A1 | 11/2011 | Kellam et al. |
| 2012/0063339 A1 | 3/2012 | Song |
| 2012/0063387 A1 | 3/2012 | Chen |
| 2012/0147868 A1 | 6/2012 | Williams et al. |

\* cited by examiner

TRANSMITTING DATA PACKETS IN AN INDUSTRIAL WIRELESS NETWORK

FIELD OF INVENTION

The present invention generally relates to wireless communication devices in industrial wireless networks. More particularly the present invention relates to a method of transmitting data packets in an industrial wireless network of a process control system as well as to a wireless communication device for an industrial wireless network and a computer program product for a wireless communication device.

BACKGROUND

Process control systems are used to control industrial processes such as chemical, oil and gas, paper and pulp and electric power generation processes.

These systems are typically computer systems and may comprise one or more process control devices, for instance in the form of one or more servers, communicating with a number of field devices. In such control systems the field devices measure properties of the process being controlled, supplies the measurements to the process control device, while the process control device supplies the field devices with control commands for controlling the process. The field devices may in such a system generate a lot of data which is supplied to the process control device.

It has recently been of interest to provide such field devices as nodes in industrial wireless communication networks. There exist a number of industrial wireless communication standards that are possible to use for industrial control purposes.

Examples of such standards are ZigBee, WirelessHart, ISA100, WIA-PA and Bluetooth. There also exist some WLAN based sensor networks.

The field devices then form nodes in an industrial wireless network and communicate with a gateway that is connected to a control device, such as a server or a special purpose controller.

However, if there are a lot of such nodes, there may be a problem that the wireless network is filled with data, which slows down the transmission from the nodes and thus slows down the control.

Furthermore, the process control system may be placed in a harsh environment, which makes transmission in the wireless network problematic.

The most common solution in available industrial wireless sensor networks to provide reliable communication is to use mesh networking, i.e., each wireless communication device is connected to two or more other devices in order to somewhat guarantee reliable communication. One way of improving the reliability in a harsh environment is to use error correction codes such as automatic repeat request (ARQ) and having alternative links for each node. To avoid having packets wandering around in the network forever, a hop counter or a time-to-live (TTL) field may be used. To achieve reliable communication the hop-counter or TTL may be configured in the range of more than 10 hops and with a TTL of several minutes to allow packets to traverse alternative paths with several retransmissions on each link. This value is however typically common for the whole wireless network, which may be problematic if the wireless network is also used for another functionality than control that has another delay requirement, where one such other functionality is safety or protection.

It is thus sometimes of interest to simultaneously use a wireless network for different types of functions having different delay requirements, such as real-time traffic and best effort traffic. These differing delay requirements cannot both be met at the same time using the TTL principle.

Another way of improving the reliability in a harsh environment is to use forward error correction (FEC). In available industrial wireless sensor networks ARQ is employed while FEC has not been implemented since that is typically implemented on the physical layer and it has previously been discussed that it consumes a lot of power for encoding and decoding.

Various other schemes have been proposed in relation to the limiting of data in industrial wireless systems, where one scheme is described in US 2012/0063339. Here packets are discarded based on the determination of an expected delay through a sensor network and a pre-determined allowable value.

However, there is still room for improvement in the field.

SUMMARY OF THE INVENTION

The present invention is directed towards providing an improved industrial wireless communication network.

One object of the present invention is to provide an improved method for transmitting data packets in an industrial wireless network.

This object is according to a first aspect of the present invention achieved through a method for transmitting data packets in an industrial wireless network of a process control system where an industrial process is controlled by a process control device based on process control data concerning process control properties and collected using the industrial wireless network, the method being performed by a wireless communication device being a node in the industrial wireless communication network, and the method comprising the steps of:

investigating if there is more than one data packet with process control data from the same data originating device destined for the process control device in a transmission queue, the data originating device being an interface to the process being controlled, and
 transmitting data packets in the transmission queue,
 if there is more than one data packet with process control data from the same data originating device destined for the process control device in the transmission queue, then further performing
  comparing time stamps of the data packets, where a time stamp reflects the time of generation of a corresponding data packet,
  keeping the newest data packet, and
  discarding older data packets, so that only the most recent data packets from a data originating device are sent to the process control device from the node.

Another object of the present invention is to provide an improved wireless communication device in an industrial wireless network.

This object is according to a second aspect of the present invention achieved through a wireless communication device for an industrial wireless network of a process control system where an industrial process is controlled by a process control device based on process control data concerning process control properties and collected using the industrial wireless network, the wireless communication device providing a node in the industrial wireless network and comprising:

a transmission buffer with a transmission queue,
 a wireless transmitter transmitting data packets in the transmission queue, and
 a packet investigating unit configured to:
  investigate if there is more than one data packet (DP) with process control data from the same data originating device destined for the process control device in the transmission queue, the data originating device being an interface to the process being controlled, and if there is more than one data packet with process control data from the same data originating device destined for the process control device in the transmission queue, then further perform compare time stamps of the data packets, where a time stamp reflects the time of generation of a corresponding data packet, keep the newest data packet, and discard older data packets, so that only the most recent data packets from a data originating device are sent to the process control device from the node.

Another object of the present invention is to provide a computer program product for a wireless communication device, which computer program product provides an improved wireless communication device.

This object is according to a third aspect achieved by a computer program product for a wireless communication device of a process control system where an industrial process is controlled by a process control device based on process control data concerning process control properties and collected using the industrial wireless network, the wireless communication device providing a node in an industrial wireless network, the computer program product comprising a data carrier with computer program code which when run in the wireless communication device, causes the wireless communication device to:

investigate if there is more than one data packet with process control data from the same data originating device destined for the process control device in a transmission queue, the data originating device being an interface to the process being controlled, and if there is more than one data packet with process control data from the same data originating device destined for the process control device in the transmission queue, then further perform compare time stamps of the data packets, where a time stamp reflects the time of generation of a corresponding data packet, keep the newest data packet, and discard older data packets, so that only the most recent data packets from a data originating device are sent to the process control device from the node.

The present invention has a number of advantages. Through ensuring that older data is removed as soon as newer data from the same source is present, data that is no longer relevant for the control is stopped from reaching a process control device. This lowers the delay and congestion in the wireless network without jeopardizing the control.

BRIEF DESCRIPTION OF THE DRAWINGS

The present invention will in the following be described with reference being made to the accompanying drawings, where FIG. 1 schematically shows a control system for controlling a process using an industrial wireless network.

DETAILED DESCRIPTION OF THE INVENTION

In the following, a detailed description of preferred embodiments of the invention will be given.

Figure 1:
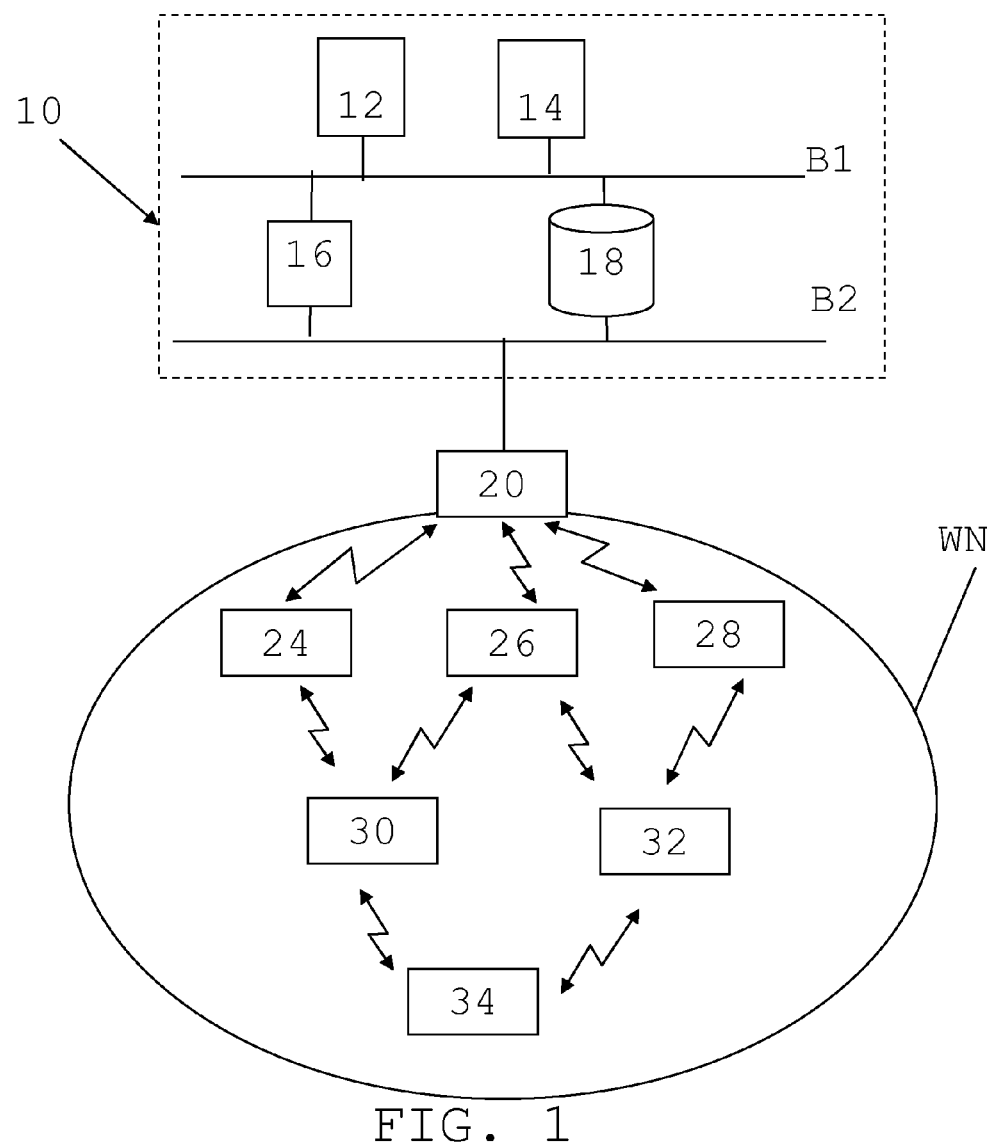

FIG. 1 schematically shows a control system 10 for a process, i.e. a process control system. The process may be an industrial process and may furthermore be any of a number of different types of processes such as a pulp and paper production process, an oil refining process, an electric power transmission process or an electric power distribution process. The control system 10 may for instance be an object based computerised system for controlling the process.

In FIG. 1 the process control system 10 includes a number of operator terminals 12 and 14 connected to a first bus B1. There is furthermore a second bus B2 and between the first and second busses there are connected a process control device 16 providing control and monitoring of the process and a database 18 where data, like historical data relating to control and monitoring of the process is stored. The process control device 16 may be implemented in the form of a server. It may also be provided in the form of dedicated special purpose hardware, such as a controller. To the second bus B2 there is furthermore connected a gateway 20, which gateway is in turn connected to a wireless network WN. The wireless network WN may be an industrial network and may also be a wireless communication network. It may more particularly be a wireless sensor and actuator network (WSAN) and may thus be an industrial wireless sensor and actuator network. In this wireless network WN there are shown seven exemplifying nodes. There is a first node 24, a second node 26, a third node 28, a fourth node 30, a fifth node 32 and a sixth node 34. These nodes are provided in the form of wireless communication devices or wireless field devices. These field devices as well as the gateway are nodes in the industrial wireless network WN. The gateway 20 may therefore be considered to be a seventh node.

The field devices are devices that are interfaces to the process and they communicate wirelessly with the gateway 20. In the exemplifying network the first, second and third nodes 24, 26, 28 are furthermore shown as communicating with the gateway 20, while the fourth and fifth nodes 30 and 32 are communicating with the first, second and third nodes 24, 26 and 28. The sixth node 34 in turn communicates with the fourth and fifth nodes 30 and 32. Although the fourth, fifth and sixth nodes 30, 32 and 34 do not communicate directly with the gateway 20, they are still able to communicate with it using hop or multi-hop technique. When for instance the sixth node 34 is sending data, this data is relayed to the gateway 20 via the fifth or sixth node together with via the first, second or third node 24, 26 and 28. In a similar manner the first, second and third node 24, 26, 28 may act as relay nodes for data sent by the fourth and fifth nodes 30 and 32.

The field devices implementing the first, second, third, fourth, fifth and sixth nodes 24, 26, 28, 30, 32 and 34 may typically be responsible for performing some type of control activity of the process, such as measuring a process parameter like a physical property of the process or providing a control activity in the process, such as actuating a valve, operating a pump, a switch etc. The actual control of the field devices is performed by the process control device 16. The activities may be combined in that a node may both measure a physical property and perform a control activity.

In the network there may also be nodes, either the same or different, that are involved in another activity than control, such as protection. In the case of protection the nodes report measurements to a protection device, for instance in the form of the process control device 16, which performs a protective activity in the process.

Figure 2:
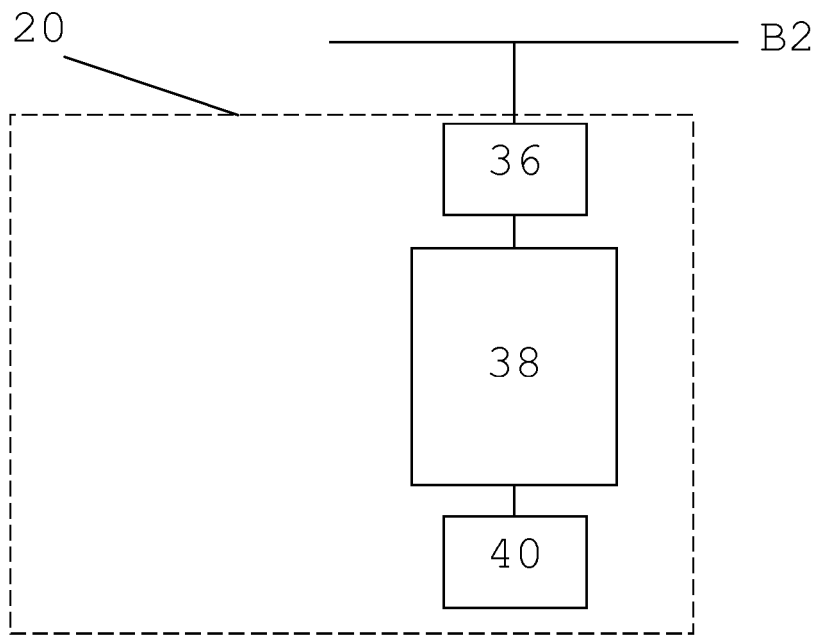
FIG. 2 shows a block schematic of a gateway communication with field devices in the industrial wireless network.

FIG. 2 shows a block schematic of the gateway 20. The gateway 20 comprises a data handling unit 38, which is connected to a wireless interface 40, typically comprising radio circuitry and one or more antennas, as well as to a communication interface 36 for communication using the second bus B2. The communication interface 36 may as an example be an Ethernet interface. The data handling unit 38 receives data from the nodes of the wireless network via the wireless interface 40 and forwards them to the process control device 16 via the communication interface 36. The data handling unit 38 also receives control commands from the process control device 16 via the communication interface 36 and sends them out to field devices in the wireless network via the wireless interface 40.

Figure 3:
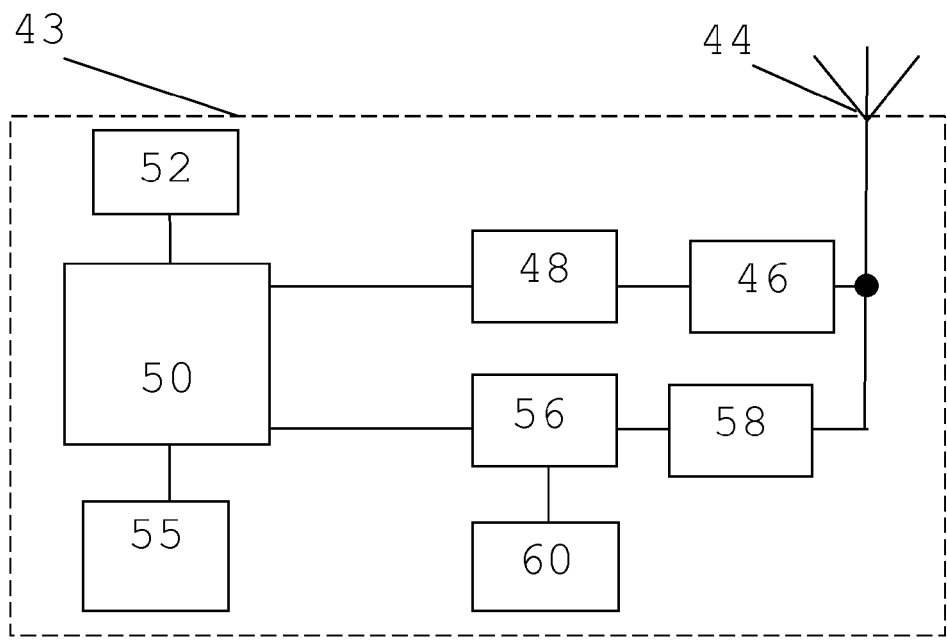
FIG. 3 shows a block schematic of a wireless communication device in the industrial wireless network, FIG. 4 schematically shows a data packet format used by the nodes in the industrial wireless network.

FIG. 3 shows a block schematic of units in a wireless communication device 43 that makes up a node in the industrial wireless network. In the present example this wireless communication device 43 is the field device that implements the fourth node 30. It should be realized that all field devices may comprise the units shown in FIG. 3. They may thus all be wireless communication devices. The wireless communication device 43 here comprises a communication control unit 50, which is connected to a transmission buffer 56, which transmit buffer 56 in turn is connected to a transmitter circuit 58 or wireless transmitter. The transmitter circuit 58 is in turn connected to an antenna 44, which is also connected to a receiver circuit 46 or wireless receiver. The receiver and transmitter circuits 46 and 58 may be combined in one circuit, a transceiver circuit. The receiver circuit 46 is in turn connected to a receiving buffer 48, which in turn is also connected to the communication control unit 50. The communication control unit 50 is further connected to a data generating unit 55 and to a data receiving unit 52. There is finally a packet investigating unit 60 connected to the transmission buffer 56.

Figure 4:
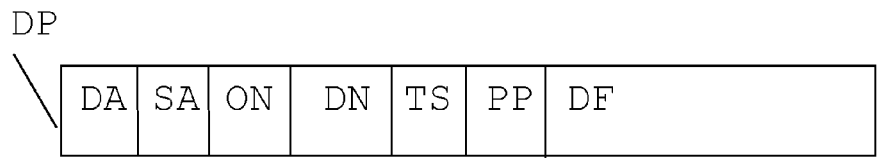

FIG. 4 schematically outlines an exemplifying data packet format DP in the system. In this format example, a packet comprises a destination address DA, a source address SA, an originating node indication ON, a destination node indication DN, a time stamp TS, a physical property field PP and a data field DF. The destination address DA is the node the packet is addressed to and the source address SA is the node sending the packet, while the originating node indicator ON is an indicator of in which node that data of the packet was generated, the destination node indicator DN is an indicator of the destination node for the data in the wireless network, which may be considered to be the final destination of the data or point of exit of the data from the wireless network. The physical property field PP is an indicator of which type of property the data in the data field DF is, i.e. which physical property of the source node that data is being sent. The time stamp TS reflects the time of generation of the data in the data field DF of the data packet.

The data communication with which the present invention is concerned is mainly communication in the uplink, i.e. from the field devices to the gateway 20. However, it should be realized that the invention may also be of interest in the downlink.

Figure 5:
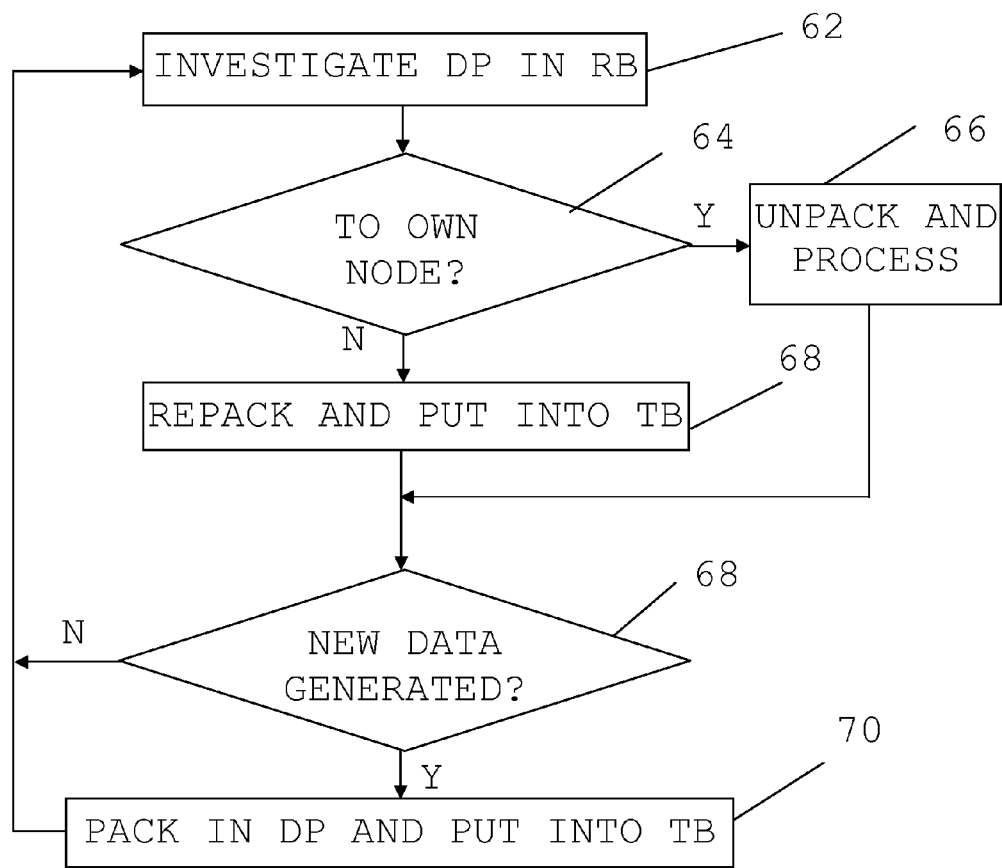
FIG. 5 shows a flow chart of a number of method steps in a method of transmitting data being performed by a communication control unit of the wireless communication device.

The functioning of a variation of the present invention will now be described with reference also being made to FIG. 5, which shows a first number of method steps being performed in the communication control unit of the wireless communication device as well as to FIG. 6, which shows a second number of method steps being performed in the packet investigating unit of the wireless communication device.

As described above, an issue for the effective function of process control is making sure that data packets arrive. Another important issue is that control is performed on fresh data. Older packets are not of any use in the control, but only delay the communication. The invention is based on this realization, which is used for obtaining more efficient control.

A node may generate data that is to be used in the control of the industrial process. All the wireless nodes, and at least all the field devices may be able to generate process control data and they may thus all be data generating nodes. A node may also be an intermediate node functioning as a relay forwarding data from a data generating node to the gateway. This allows the industrial process to be controlled by the process control device 16 based on process control data concerning process control properties, such as temperature and pressure, voltage and current, and collected using the industrial wireless network WN.

In a process control system it is necessary that relevant data is forwarded to a process control device, here exemplified by the process control device 16, at a speed determined by how fast the control has to be performed. The control of the process may for instance require that data used for the control is to be received within a process control time limit and if not, they are not possible to act on. The control may require that the data is received within a control period or control cycle. A control period, control cycle or control loop time period may thus be the time period required for being able to control the process properly.

Data will thus need to be provided in time. At the same time, systems are big and the more nodes that are trying to send data in the wireless system, the more bottlenecks will occur where data is queued. The system will thus get clogged. The more data that is sent in to the system, the longer the delays will become. A long delay may then jeopardize the control. Furthermore, data sent via a route may not reach the destination, which may also be hard to handle.

Furthermore, the environment in which the wireless communication system is provided may be a harsh environment.

If the environment in the industrial automation is harsh, there will be problems with the wireless communication. These harsh environments make radio communication a challenge, especially for the above-mentioned real-time communication where there are strict delay requirements and where a deterministic behavior is required. The most common solution in available industrial wireless sensor networks to provide reliable communication is to use mesh networking, i.e. each device is connected to two or more devices in order to somewhat guarantee reliable communication. However, available Industrial Wireless Sensor Network standards such as Wireless HART, ISA100 and WIA- PA do not consider how to deal with real-time communication for industrial wireless control.

There is therefore a need for addressing one or more of the above mentioned problems.

The functioning of a method according to the invention will now be described with reference being made to the fourth node 30, which is a node generating data that is intended for the process control device in the process control system. The node is thus a data generating node. The wireless communication device is thereby also a data originating device that is an interface to the process being controlled. The node is also a relay or intermediate node connected in a path between a data generating node and the destination node, which relay node receives data from other nodes and forwards this data to the process control device 16.

The node 30 may thus be a node that senses one or more physical properties, such as the temperature and/or pressure, current and/or voltage and sends measurements values of the measured properties to the process control device 16.

The node may receive data packets DP from other nodes, which packets are received by the receiver circuit 46 via the antenna 44. The packets DP are then forwarded to the reception buffer 48, where they are investigated by the communication control unit 50, step 62. The communication control unit 50 more particularly investigates the destination node DN. The communication control unit 50 may here investigate the received packets and notice if they are intended for the receiving unit 52 of the node. The node thus investigates if the packets in the receiving buffer 48 are intended for itself or if the destination is another node. If the destination node DN is itself, here the fourth node 30, then the data of the packet is unpacked and provided to the data receiving unit 52 where it is processed, step 66, while if it is not, step 64, the data is repacked and put into a transmission queue in the transmission buffer 56, step 68. If the fourth node 30 has direct contact with the destination node, then the destination address may be the address of the destination node and otherwise the destination address may the address of an intermediate node. If broadcast is used, the destination address may be a broadcasting address. The source address SA is also changed into the own source address.

In both cases, whether the packet DP was for the own node or not, the communication control unit 50 goes on and investigates if new data is generated by the data generating unit 55. If not, the communication control unit 50 returns and investigates the reception buffer, step 62, while if there was, new data is provided by the data generating unit 55.

The data generating unit 55 thus generates data for transmission to the process control device 16. This data may be generated according to a data generating scheme. The scheme may for instance specify that data is to be generated at fixed time intervals, such as every 10 milliseconds. In this first type of scheme the data generating nodes may generate the data packets periodically. The scheme may as an alternative specify that data is to be generated if there is a change in the physical property being reported. In this second type of scheme the data generating nodes may generate data for the data packets based on events when there is a change in the process control property provided by the data packets. The data packets formed with this type of data in the transmission queue are thereby event based data packets.

If there is data, step 70, the communication control unit 50, packs the data in one or more packets DP and puts them in the transmission queue in the transmission buffer 50 for transmission in the wireless network, step 70.

In the packing of the data packet DP, the own address is provided as source address SA, another address, for instance the address of the destination node, the address of an intermediate node or a broadcasting or multicasting address as destination address DA, an indication of itself as originating node ON, an indication of the process control device 16 or gateway 20 as destination node DN, a time stamp TS reflecting the time of generation of the data, a physical property indication PP indicating the type of property and a finally the data itself is provided in a data field DF.

Data that is generated is thus provided from the data generating unit 55 to the communication control unit 50, which packs the data into a packet DP and gives the packet a time stamp TS representing the time of generation of the data. The communication control unit 50 then puts the packet DP in the transmission queue of the transmission buffer 56 for being transmitted to other nodes.

Also the transmitter circuit 58 may place packets in the transmission buffer 56. Packets that have been transmitted but have not been received by other nodes may be put in the transmission queue for retransmission.

Figure 6:
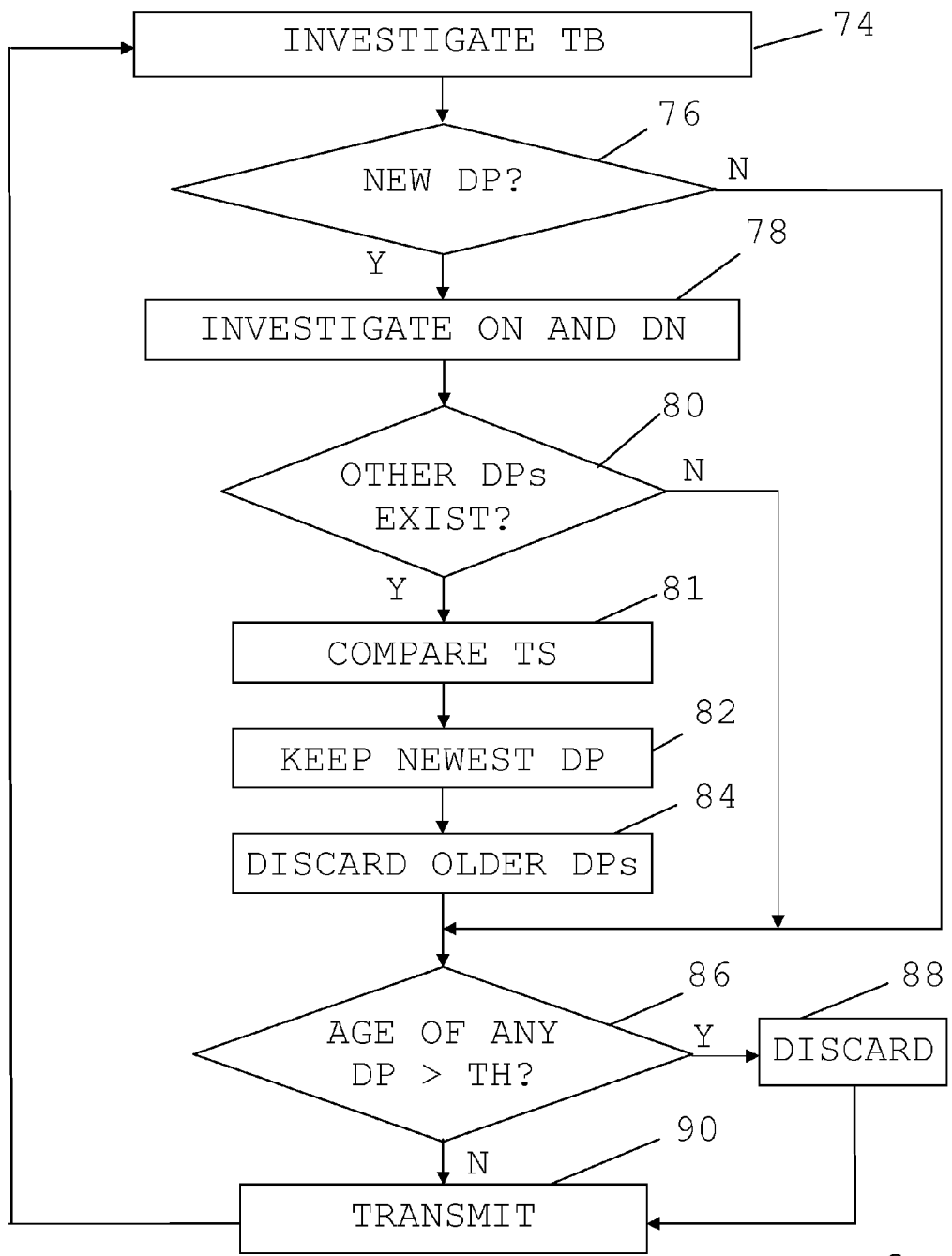
FIG. 6 shows a flow chart of number of further method steps in the method of transmitting data being performed by a packet investigating unit of the wireless communication device, and FIG. 7 schematically shows a data carrier carrying program code for implementing a node configuration control unit of a wireless communication device or a network topology determining unit of a network manager device.

The transmission buffer 56 is then investigated by the packet investigating unit 60, step 74 of FIG. 6.

The transmission buffer 56 may operate on a first in first out principle in the transmission queue, where the most recently received packet may be provided at the top of the buffer and the oldest packet, i.e. the one destined for transmission next, at the bottom of the buffer, or vice versa.

The investigation may comprise an investigation of the most recently received packet, which in this example is the packet at the top of the buffer. If there is no new packet DP, step 74, then the packet investigating unit 60 goes on and investigates the packet to be transmitted, which in this example is the packet at the bottom of the buffer 56. However, if there is a newly received packet, step 76, the packet investigating unit 60 may continue and investigate if there is more than one data packet DP with process control data from the same data originating device destined for the process control device in the transmission queue of the transmission buffer 56. This may be done through investigating the originating node ON and the destination node DN, step 78 and optionally also the physical property PP of this packet. These values may be compared with the same values of the other packets in the transmission buffer 56 in order to investigate if there are more data packets in the transmission buffer 56 from the same source as the newly received packet.

If the packet investigation unit 60 cannot find any other packets from the same source, i.e. there are no older or newer data packets from the same source, step 80, then continues and investigates the age of the packets in the transmission queue.

However, if there are older data packets from the same source, step 80, i.e. if there is more than one data packet (DP) with process control data from the same data originating device destined for the process control device in the transmission queue, the time stamps of these data packets from the same source are compared, step 81.

The data packet that is found to be newest in the comparison is then kept or retained, step 82, while the older data packets are discarded, step 84. This means that the data packet from the same source, i.e. originating node, being destined for the process control device having the most recent time stamp is retained, while data packets with older time stamps from the same source for the same destination are discarded. In this way only the most recent data packets from a data originating device are allowed to be sent to the process control device from the fourth node 30. The newest data packet is here the data packet having the newest time stamp, which is not necessarily the packet at the top of the buffer as there may be retransmissions.

It can thus be seen that for the above mentioned real-time data, old data is not buffered for re-transmission if newer real-time data is present. If newer real-time data exists, the old data is thus discarded in favor of the newer data.

In a control application the transmission of old data can have enormous consequences or severely degrade the automatic control. More importantly, since newer data has already arrived, the old data does not add any information useful for control. On the contrary, if the process control device trusts old data to comprise fresh measurement information (without checking the time stamp) it will in fact do more harm than good.

The packet investigating unit 60 may here investigate the time stamps of packets from the same source node SN, and keep the newest packet and discard or remove older packets from the same source node. The discarding may be a discarding of all older packets from the same node. However, the investigation may also be an investigation regarding a process control property or physical property, which means that the newest packet concerning a physical property sent by a source node is kept and all other packets from the same source node regarding the same physical property are discarded or deleted. This means that for instance a new packet reporting a new pressure value from a source node will not cause an earlier temperature value from the same source node to be deleted or discarded.

The packet investigating unit 60 then investigates the packets in the transmission queue. This investigation may be an investigation of the data packets due to be transmitted, which in this example are the packets at the bottom of the transmission buffer 56.

In this age investigation, the age of the packets in the transmission queue are compared with an age threshold TH, step 86, which age threshold has a value related to the control cycle of the process control device. The age value may thus correspond to control cycle of the process control device. The age is thus compared with a time period in which the process control system needs data for performing control. In the transmission queue, the time stamp TS of a packet ready for transmission, which may be the packet at the top or bottom of the stack, may as an example be compared with an age threshold TH corresponding to the process cycle. In one embodiment the threshold value is set to be equal to the control cycle. If the time is below the threshold, step 86, then the data packet is transmitted by the transmitter circuit 58, step 90, and the packet investigating unit 60 returns and investigates the newest data packet, step 74.

However, if the time stamp TS of the packet due for transmission indicates an age that is older than the age threshold TH, step 86, then the packet is discarded, step 88, and the following packet in the buffer may be transmitted instead, step 90, (perhaps after a corresponding check), followed by yet again investigating the newest data packet, step 74.

The comparison with the threshold TH may especially be used if all packets are generated at regular time intervals, irrespective of if there are any changes to the physical property they reflect. However, in case packets are only generated when there are changes to the physical property being reported by a node, then it is possible that this comparison with a threshold is omitted. This investigation may also be omitted for packets, where the node is the originating node.

It is also possible that all packets in the queue are compared with the threshold at or around a given instance in time and not only the packet due to be transmitted. Any one of these investigated packets that fail the comparison will then be discarded. It can thus be seen that data packets having an age that is older than the age threshold are discarded.

It can thus be seen that data in a packet is only forwarded if the age of the packet is lower than the period time or cycle period of process control or real-time packets. Otherwise, real-time packets should be discarded in favor of new real-time packets in order to limit the network utilization.

After a packet has been discarded, step 88, the packet investigating unit 60 returns and investigates the buffer from the top, step 74.

Packets that have passed the test, i.e. have time stamps that are below the threshold, step 86, are then transmitted by the transmitting circuit 58 via the antenna 44, step 90. The wireless transmitter 58 thus transmits data packets in the transmission queue.

The transmission may be a point to point transmission, i.e. from the node to another node according to a path set up from the originating node to the destination node. However, the transmission may also be made at the same time to more than one node. The packet may be simultaneously transmitted to a number of selected nodes, i.e. it may be multicast. The packet may also be broadcast to all nodes in the vicinity. This multicasting or broadcasting may also be combined with omitting retransmissions.

When the fourth node 30 transmits (real-time) data, the data is thus not only transmitted to the next intermediate node or its destination, but rather transmitted to a plurality of other nodes. It may more particularly be multicast or broadcast to several nearby nodes for increased reliability and to minimize the packet error rate, i.e. use the advantage of the shared wireless medium. When broadcasting or multicasting is used, there is thus no point-to-point sending combined with retransmission with an alternative path in case of transmission failure. This will also have impact on latency and network utilization.

It can in this way be seen that data packets that hold old data will be discarded. This is important since only the most recent data is normally of interest in the control of the process. Thereby the network load is diminished and control may be efficiently implemented. This is especially important when the wireless communication device is operating as a source node. Furthermore, data that can no longer be used, like data that is too old to be used for control, is also omitted. Thereby the number of packets that hold old data that cannot be used or that is irrelevant because of the existence of newer data is reduced. Thereby relevant data that can be effectively used may reach its destination node faster.

The use of sending the packet to several nodes has the further advantage of increasing reliability.

The invention thus provides a simple but yet very effective way to limit network congestion and deliver real-time data in a timely manner in the same order as transmitted from the source. Furthermore, the method can be used without violating wireless communication standards, such as the current IEEE 802.15.4 standard.

It can be seen that the invention may avoid the use of buffers for data to be retransmitted in a meshed network, and in addition it increases reliability without alternative transmission paths possibly combined with transmitting all real-time data using multicast or broadcast instead of point-to-point. This improves the reliability, latency and network utilization for real-time data for control applications.

To save communication bandwidth, old or delayed realtime data should therefore be discarded as soon as possible, and most importantly not be delivered after newer data has already been successfully delivered to the destination.

Figure 7:
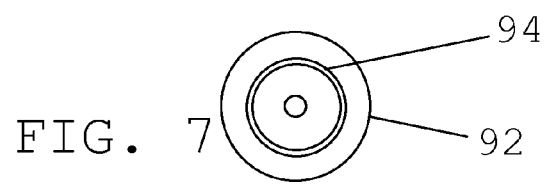

The communication control unit and packet investigating unit of the wireless communication device may be realized in the form of a discrete component, such as an Application Specific Integrated Circuit (ASIC) or Field-Programmable Gate Array (FPGA) circuit, which may also comprise the other units and circuits of the node. However, the communication control unit and packet investigating unit may also be realized through a processor with an associated program memory including computer program code for performing the functionality of these units when being run on the processor. This computer program product can be provided as a data carrier such as one or more CD ROM discs or one or more memory sticks carrying computer program code, which provides the above-described access control unit when being run by said processor. One such data carrier 92 in the form of a CD ROM disk with a computer program 94 carrying such computer program code is schematically shown in FIG. 7.

From the foregoing discussion it is evident that the present invention can be varied in a multitude of ways.

One possible variation is that time division multiple access (TDMA) may be used, in which case a network manager, typically provided in the gateway, assigns time slots to the wireless communication devices. In this case data sent in a time slot from one device does not need to comprise a destination and source addresses. The devices that are to send and receive data in a specific time slot may have then have been determined beforehand by the network manager, why it is not necessary to include source and destination addresses. It is also possible to omit the physical property field and physical property indicator.

The age threshold may be set to the control cycle period. It may also be set as the control cycle period together with an offset, either positive or negative and preferably negative. It may furthermore be set as a value that is a number of times higher or lower than the control cycle period, and preferably lower. It may for instance be set as 1.5, 2 or 3 times lower. It shall consequently be realized that the present invention is only to be limited by the following claims.

The invention claimed is:

1. A method of transmitting data packets in an industrial wireless network of a process control system where an industrial process is controlled by a process control device based on process control data concerning process control properties and collected using the industrial wireless network, the method being performed by a wireless communication device being a node in the industrial wireless communication network, and the method comprising the steps of:
   investigating when there is more than one data packet with process control data representing the same process control property from the same data originating device destined for the process control device in a transmission queue, said data originating device being an interface to the process being controlled and configured to sense more than one process control property;
   comparing the age of the data packets in the transmission queue with an age threshold, which age threshold has a value related to a control cycle of the process control device;
   discarding data packets older than the threshold;
   transmitting data packets in the transmission queue; and
   when there is more than one data packet with process control data representing the same process control property from the same data originating device destined for the process control device in the transmission queue, then further performing the steps of:
   comparing time stamps of the data packets, where a time stamp reflects the time of generation of a corresponding data packet;
   keeping the newest data packet; and
   discarding older data packets, so that only the most recent data packets from a data originating device are sent to the process control device from said node.

2. The method according to claim 1, wherein the transmitting is a transmitting of the data packets in the transmission queue to a plurality of other nodes.

3. The method according to claim 2, wherein the data packets in the transmission queue comprise event based data packets generated when there is a change in the process control property provided by the data packets.

4. The method according to claim 2, wherein the data packets are generated periodically by data generating nodes.

5. The method according to claim 2, further comprising generating data and packing the data in data packets and putting the packets in the transmission queue.

6. The method according to claim 1, wherein the data packets in the transmission queue comprise event based data packets generated when there is a change in the process control property provided by the data packets.

7. The method according to claim 6, further comprising generating data and packing the data in data packets and putting the packets in the transmission queue.

8. The method according to claim 1, wherein the data packets are generated periodically by data generating nodes.

9. The method according to claim 8, further comprising generating data and packing the data in data packets and putting the packets in the transmission queue.

10. The method according to claim 1, further comprising generating data and packing the data in data packets and putting the packets in the transmission queue.

11. A wireless communication device for an industrial wireless network of a process control system where an industrial process is controlled by a process control device based on process control data concerning process control properties and collected using the industrial wireless network, the wireless communication device providing a node in the industrial wireless network and comprising:
   a transmission buffer with a transmission queue;
   a wireless transmitter transmitting data packets in the transmission queue; and
   a packet investigating unit configured to:
      investigate when there is more than one data packet with process control data representing the same process control property from the same data originating device destined for the process control device in the transmission queue, said data originating device being an interface to the process being controlled and configured to sense more than one process control property; and
      when there is more than one data packet with process control data representing the same process control property from the same data originating device destined for the process control device in the transmission queue, then further configured to:
   compare time stamps of the data packets, where a time stamp reflects the time of generation of a corresponding data packet;
   keep the newest data packet; and
   discard older data packets, so that only the most recent data packets from a data originating device are sent to the process control device from said node, wherein the packet investigating unit is further configured to compare the age of the packets in the transmission queue with an age threshold, which age threshold has a value related to a control cycle of the process control device, and discard data packets older than the age threshold.

12. The wireless communication device according to claim 11, wherein the wireless transmitter is set to transmit the data packets in the transmission queue to a plurality of other nodes.

13. The wireless communication device according to claim 12, wherein the data packets in the transmission queue comprise event based data packets generated when there is a change in the process control property provided by the data packets.

14. The wireless communication device according to claim 12, wherein the data packets are generated periodically by data generating nodes.

15. The wireless communication device according to claim 12, wherein the node is a data generating node and further comprising a data generating unit configured to generate the data.

16. The wireless communication device according to claim 11, wherein the data packets in the transmission queue comprise event based data packets generated when there is a change in the process control property provided by the data packets.

17. The wireless communication device according to claim 11, wherein the data packets are generated periodically by data generating nodes.

18. The wireless communication device according to claim 11, wherein the node is a data generating node and further comprising a data generating unit configured to generate the data.

19. The wireless communication device according to claim 11, wherein the node is an intermediate node connected in a path between a data generating node and the destination node.

20. A computer program product for a wireless communication device of a process control system where an industrial process is controlled by a process control device based on process control data concerning process control properties and collected using the industrial wireless network, the wireless communication device providing a node in an industrial wireless network, the computer program product comprising a non-transitory data carrier with computer program code which when run in the wireless communication device, causes the wireless communication device to:

investigate when there is more than one data packet with process control data representing the same process control property from the same data originating device destined for the process control device in a transmission queue, said data originating device being an interface to the process being controlled and configured to sense more than one process control property;

compare the age of the packets in the transmission queue with an age threshold, which age threshold has a value related to a control cycle of the process control device;

discard data packets older than the age threshold; and when there is more than one data packet with process control data representing the same process control property from the same data originating device destined for the process control device in the transmission queue, then further:

compare time stamps of the data packets, where a time stamp reflects the time of generation of a corresponding data packet;

keep the newest data packet; and discard older data packets, so that only the most recent data packets from a data originating device are sent to the process control device from said node.

* * * * *